April 8, 1924.
L. W. CLOSE
BEARING
Filed Aug. 21, 1918
1,489,345
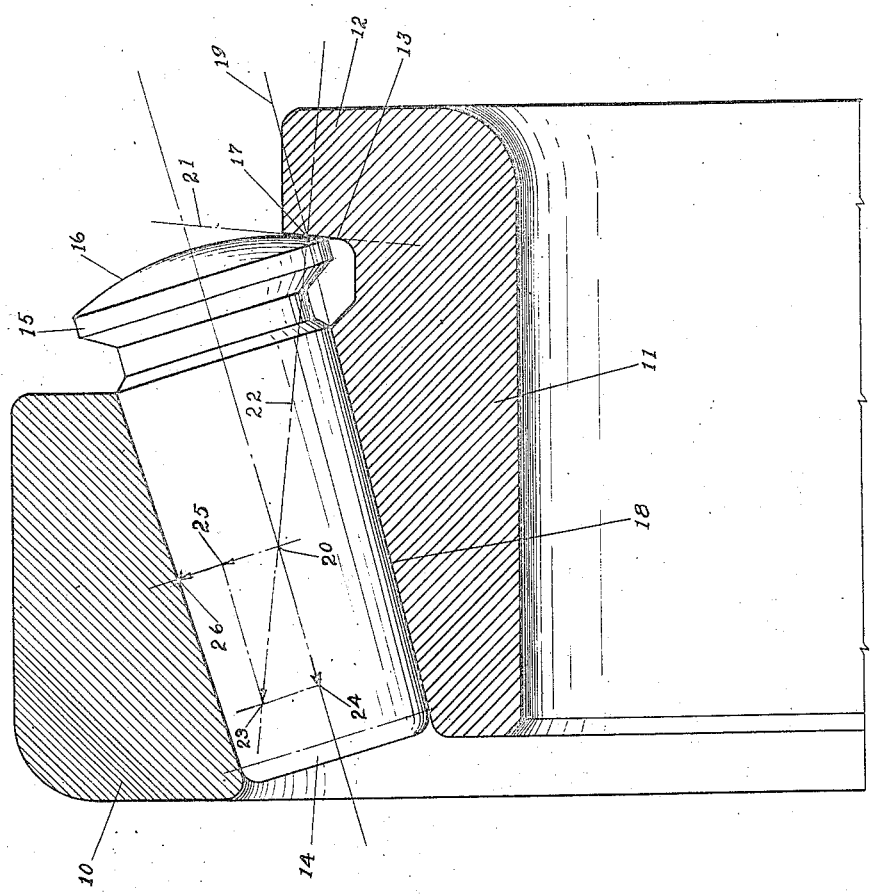
Lyman W. Close
Inventor
By B. M. Kent
Attorney Patented Apr. 8, 1924.

1,489,345

UNITED STATES PATENT OFFICE.

LYMAN W. CLOSE, OF CLEVELAND, OHIO, ASSIGNOR TO THE STANDARD PARTS COMPANY, OF CLEVELAND, OHIO, A CORPORATION OF OHIO.

BEARING.

Application filed August 21, 1918. Serial No. 250,776.

*To all whom it may concern:*

Be it known that I, LYMAN W. CLOSE, a citizen of the United States, and a resident of Cleveland, county of Cuyahoga, State of Ohio, have invented certain new and useful Improvements in Bearings, of which the following is a specification.

This invention relates to roller bearings and more particularly to bearings having conical rollers.

In bearings having conical rollers wherein the end thrust in the roller is taken by the head of the latter, as illustrated in the H. L. Bock Patent No. 1,144,751, granted June 29, 1915, the line of reaction between the thrust surfaces intersects the axis of the rollers at a point near one end of the rolling surface. At the point where this reaction intersects the axis of the roller, it is resolved into two components, one of which is along the axis of the roller and the other is normal to the rolling surface of roller at a point on the line of contact with the outer race. The latter component increases the pressure between the rolling surfaces, in the region where it intersects the latter, and this increase in pressure increases the resistance to rolling in the region of its action, and results in a tendency for the roller to work out of proper alignment.

It is one of the objects of the invention to overcome the above tendency by providing a bearing in which the thrust reaction on the roller, is along a line intersecting the axis of the roller at the intersection with a line which is normal to the line of contact between the roller and outer race at the middle of the rolling surface of the roller.

Other objects and features of novelty will be apparent from the following description taken in connection with the accompanying drawing, which is a somewhat diagrammatical longitudinal section of a bearing embodying the invention.

Referring to the drawing, 10 indicates the outer race of a typical bearing of the kind referred to. The inner race is indicated at 11 and is provided with a flange 12, at one end, having a conical thrust surface 13, against which the heads of rollers 14, between the races bear.

The form of bearing illustrated is of the type shown in the Bock Patent No. 1,144,751, and in this type of bearing each of the rollers has an enlarged head 15, the end surface 16, of which, is preferably spherical and contacts with the thrust surface 13 at the point 17, in line with the rolling surface 18, as indicated by the line 19.

As described in the Bock Patent No. 1,144,751, the surface 16 contacts with the surface 13, only at the point 17 and in accordance with the principles of my invention, the center of the spherical surface 16 is at the point 20, on the axis of the roller, the point 20 being substantially at the middle of the rolling surface of the roller. The conical surface 13 is so formed that the radius of the surface 16, at the point 17, will be normal thereto. Under this condition, the element 21 of the conical surface 13, at the point 17, is at right angles to the line 22, which represents the radius of the surface 16, at the point 17.

In a bearing of the type illustrated, there is a certain amount of end thrust in each of the rollers and this is taken by the reaction from the thrust surface 13 which reaction is in the direction of the line 22. This reaction will be resolved into two components. If the line between the points 20 and 23 indicates the reaction, this may be resolved into the components represented by the line 20 to 24 on the axis of the roller and the line 20 to 25 which is in a direction normal to the rolling surface and intersects the latter at the point 26, substantially midway between the ends of the rolling surface.

The component of the thrust reaction which is resolved along the axis of the roller and represented by the line 20 to 24, is equal to the actual end thrust in the roller, whereas the component represented by the line 20 to 25 increases the pressure between the rolling surfaces. On account of the component, represented by line 20 to 25 intersecting the rolling surface of the roller at a point midway between the ends of this surface, this increase in pressure over that due to the normal load on the roller has no tendency to cause a cocking of the roller as would be the case if this component intersected the rolling surface of the roller near either end of the latter.

Having thus described my invention, what I claim is:

1. In a roller bearing, the combination of complimentary race members, conical rollers there-between, one of said race members having a thrust surface for the rollers, and each of said rollers having a spherical surface at one end adapted to contact with said thrust surface at a point in line with the line of rolling contact of the roller, and the center of said spherical surface being located on the roller axis at the intersection with a normal to the rolling surface of the roller midway between the ends of the rolling surface, as and for the purpose described.

2. In a roller bearing, the combination of inner and outer race members, conical rollers there-between, the inner race member having a flange at one end provided on the side adjoining the rolling surface with a conical thrust surface for the rollers, and each of said rollers having a spherical surface at one end adapted to contact with said thrust surface at a point in line with the line of contact of the rollers with said rolling surface, and the center of said spherical surface being located on the roller axis substantially midway between the ends of rolling surface of the roller, as and for the purpose described.

3. In a roller bearing, the combination of complimentary race members, conical rollers there-between, one of said race members having a thrust surface for the rollers, and each of said rollers having an end surface contacting with said thrust surface, and said surfaces being so formed that the line of reaction between each roller and said thrust surface intersects the roller axis substantially midway between the ends of the rolling surface of the roller.

4. In a roller bearing, the combination of inner and outer race members, conical rollers there-between, the inner race member having a conical thrust surface for the rollers, and each of said rollers having a spherical end surface contacting with said thrust surface, the elements of said conical surface at the points of contact with said spherical surfaces being normal to the radii of the spherical surfaces, and the line of reaction between each roller and said conical surface intersecting the axis of the roller substantially midway between the ends of the rolling surface of the roller.

In testimony whereof I affix my signature.

LYMAN W. CLOSE.